Oct. 13, 1964 N. B. WALES, JR 3,153,227

DISPLAY DEVICE HAVING MAGNETICALLY CONTROLLED PLURAL INDICIA PLATES

Filed June 30, 1960 2 Sheets-Sheet 1

INVENTOR.
NATHANIEL B. WALES. JR.

BY Chas L. Johnson Jr

ATTORNEY

INVENTOR.
NATHANIEL B. WALES, JR.
BY Chas. L. Johnson Jr.
ATTORNEY

United States Patent Office 3,153,227

Patented Oct. 13, 1964

3,153,227

DISPLAY DEVICE HAVING MAGNETICALLY CONTROLLED PLURAL INDICIA PLATES

Nathaniel B. Wales, Jr., Sharon, Conn., assignor to Monroe International Corporation, a corporation of Delaware Filed June 30, 1960, Ser. No. 39,838
9 Claims. (Cl. 340—324)

This invention relates to display apparatus for association with data processing systems.

More particularly, and in an important aspect, this invention relates to a system for visually displaying numercial information associated with data processing operations.

Heretofore, in the prior art, display systems have required complex ancillary equipment for translating short duration, low level electrical signals, advantageous in high speed data processing circuits, into signals which are useful to the slowly reacting human being. Thus, many advantages of elegant data processing circuitry have been lost in translating information derived within this circuitry to the external world.

The need for these complexities has stemmed in part from the fact that display flags or indicator members bearing information sensible to the human being must be of a physical size to possess substantial inertia. Thus, the response of such flags has required electrical signals of a duration completely incommensurate with the rapidity of the operation of processing apparatus. Further, the necessity for amplifying data processing signals to a level sufficient for actuating relatively ponderous physical indicators has required complex circuitry in addition to the circuitry required for directing amplified data processing signals to actuate appropriate physical indicators.

Accordingly, it is an object of the invention to display data processing information rapidly.

It is a further object of the invention to eliminate the need for the amplifying of data processing information signals.

It is a further object of the invention to simplify information directing circuitry.

These and other objects are achieved in one specific, illustrative embodiment of the invention by the employment of plural groups of digit indicator members. Each of the indicator members in a group has an individually associated actuating spring member arranged for urging the indicator member toward a first, indicating position. The individual indicator members within each of the groups, further, are arranged along an axis in decreasing order of numerical significance with the indicating members of increasingly higher numerical significance being more proximate the eye of the viewer or some other sensing device such that, in an indicating position, the most significant digit member masks indicating members of lesser significance. Further, the groups of digit indicating members are arranged from left to right in order of decreasing significance so that, from left to right, the first group of indicators may have the significance of a millions digit, the fourth group may have the significance of a thousands digit, and so on.

Each one of the indicator members has one or more magnetically responsive elements fixed thereon in identifying space coded disposition at a member portion most removed from the indicating position. It will be clear to those skilled in the art that these magnetically responsive members might be replaced by electrostatically responsive elements and the term "electromagnetic" employed in the claims appending this application include both electrostatic and magnetic elements.

Further, in this illustrative embodiment of the invention, all the indicator members of the group are constrained, by suitable means, for motion between two alternative extreme positions. More specifically, they are mounted for translation motion between an upper, indicating position and a lower, non-indicating position. It is clear to those skilled in the art, however, that such indicator members may, in other embodiments of the invention, be rotated as well as translated between extreme positions.

The spring members associated with the individual indicator members, it has been noted, are arranged to urge the indicator members to an extreme, indicating position. Thus, in the absence of any counteracting force on these members the members of each group would be positioned to indicate a most significant digit. That is to say, in this specific embodiment of the invention adapted to decimal systems indications, the digit 9 would be displayed and would mask all digits of lesser significance.

In a direction toward the opposite extreme position of the indicator members, plural magnetic cores are arranged in a space coded relation corresponding to the arrangement of the space coded electromagnetically responsive elements carried by the indicator members of the group. In one embodiment two magnetizing windings are wound about each core. The first one of these windings is selectively connected, in common with like windings of other cores, to a potential source. These first windings and the associated potential source are designed, in relation to the above mentioned spring members and the space coded responsive elements associated with each indicator member, to hold the indicator member with substantially more force than is necessary to overcome the opposite urging of the aforementioned spring.

Means are provided for resetting the electromagnetically responsive elements of the indicator members in each group into magnetically engaged relation with the magnetic field generated by the aforementioned first windings. In this manner, all the indicator members of all the groups in this illustrative embodiment of the invention are placed in an extreme, non-indicating position. In this position, these members are held by the aforementioned first windings.

A second potential source and an appropriate selecting mechanism is provided. This second source cooperates with the second windings of magnetic cores of a selected group to oppose the magnetic bias established by the first windings. These second windings and the second potential source are so adjusted, in relation to the aforementioned spring member, that, upon appropriate operation of the selecting mechanism, all the indicator members of a selected group are held in a non-indicating extreme position by a threshold magnetic field. That is to say, the magnetic field generated by the aforementioned second windings of the selected group is in a direction to oppose the aforementioned bias magnetic field. This opposition is limited such that the resultant magnetic field is at a threshold level just sufficient to overcome the opposite urging force of the spring members associated with the indicator members in the selected group. Similarly arranged and actuated electromagnets are disclosed and claimed in my copending application Serial Number 781,338, filed December 18, 1958, now abandoned, and entitled "Electromechanical Magnetic Matrix."

A plurality of conductors, respectively associated with a third winding or with the first or second winding, on the magnetic cores of each group of cores, are connected to a signal source such as a substantially conventional computing apparatus. Thus, means are provided for selectively applying signals to the aforementioned conductors in a direction further to oppose the aforementioned magnetic biasing signal.

According, the signals applied to the aforementioned conductors selectively release indicating members from the threshold magnetic field which opposes the spring force applied to all indicating members. Hence, selected ones of the indicating members are released from the holding magnetic field and are urged to an indicating position. Thereafter, similar operations are performed on other groups of indicating members in response to signals derived from substantially conventional computing apparatus which derived signals have been applied to the aforementioned conductors. Hence, as the aforementioned bias opposing signals are successively and selectively applied to the groups of indicating members, a full indication of a decimal quantity is presented by the most significant displayed one of the indicating members in all the groups.

Thus, it is a feature of the invention that plural groups of indicating members are arranged for displaying successive digits of an information group in an ordered sequence.

It is a further feature of this invention that these indicator members are arranged in groups along a first axis for providing mutual display shielding from the member of highest significance to the lowest.

It is a further feature of the invention that means are provided for constraining the individual members of an indicator group to move between extreme positions in a plane substantially perpendicular to the aforesaid axis of arrangement of these members.

It is a further feature of the invention that appropriate means, for example, spring urging means are provided to urge all members of a group toward one of the aforementioned indicating positions.

It is a further feature of the invention that electromagnetically responsive elements are disposed on the aforementioned indicator members in space coded relation and in a position toward the opposite extreme position from that to which the indicator member is urged by the aforementioned spring members.

It is a further feature of the invention that a plurality of electromagnetic signal generating means are disposed in cooperative relation with electromagnetically responsive elements disposed upon the indicator members.

It is a further feature of this invention that means are provided for generating at least two opposing signals for electromagnetic cooperation with selected ones of the aforementioned elements.

It is a further feature of the invention that means are provided to apply a biasing electromagnetic field generating signal to the first one of the above noted generating means in a direction to oppose and overcome the urging of the aforementioned urging means.

It is a further feature of the invention that means are provided for selectively applying a signal to oppose the above noted biasing signal on each electromagnetic signal generator of a group, thereby, in cooperation with the urging means, to place the indicating members in a threshold condition at one extreme, non-indicating position.

It is a still further feature of the invention that means are provided for selectively controlling the individual electromagnetic signal generators in a direction consistent with the urging of the urging means whereby the threshold electromagnetic force is selectively overcome.

These and other objects and features of the invention will become more clear from a consideration of the following brief description of an illustrative embodiment of the invention taken together with the drawings and the appended claims.

Figures 1, 5, 6:
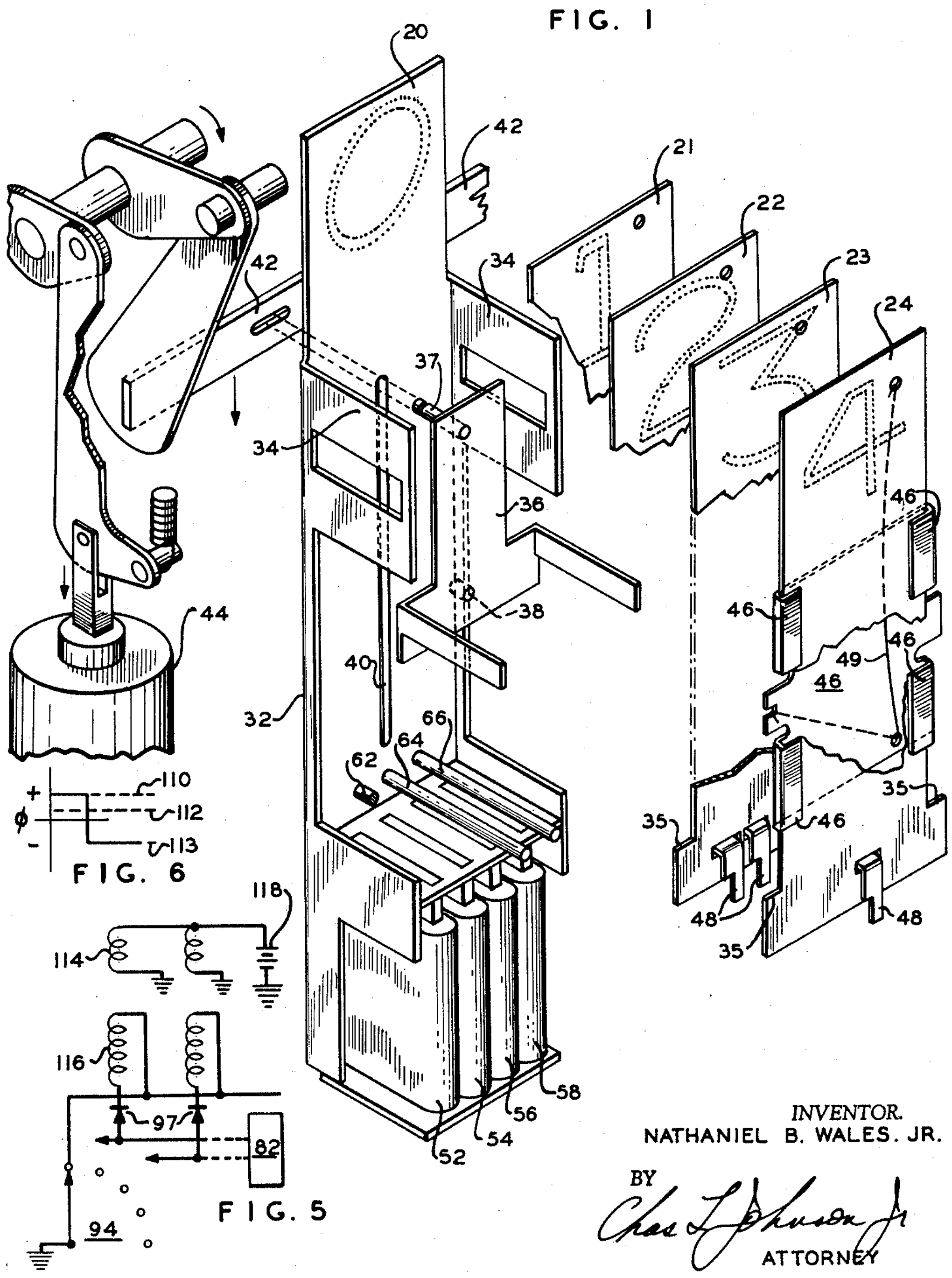
FIG. 1 is an exploded isometric view of a single digit display apparatus in accordance with the invention.
FIG. 5 is a schematic of an alternative coil arrangement.
FIG. 6 is a diagram of the magnetic flux acting on the indicating members of the invention as shown in FIG. 5.

Looking first to FIG. 1, there is seen an array of plural digit display flags 20, 21, 22, 23, 24 for indicating the digits zero through four. As logically follows, in this exploded view the five digits indicated are representative of a complete array of the ten Arabic digits 0 through 9. As illustrated, these flags are mounted along a common axis in order of increasing significance from left to right.

The zero digit flag 20, as illustrated, is fixedly mounted to a frame member 32 inasmuch as this flag indicates a null value. The frame member 32 comprises guide arms 34 and is slotted at the position 40. Each one of the indicator flags is provided with shoulders 35 at a lower extremity. A downward transport member 36 cooperates with the shoulders 35 for driving the flags all downwardly under appropriate conditions.

The transport member 36 has fixedly mounted thereto slot engaging rods 37 and 38, the rod 38 merely providing guidance for the transport member in cooperation with the slotted frame member 32.

The rod 37 passes through the slotted frame member for external actuation in a downward direction by the bar 42. This bar being actuated downwardly by an appropriate signal applied to electromagnet 44, the arms of the transport member 36 operate downwardly on the shoulders 35. Thus, this transport member moves all the indicating flags downwardly to an extreme position upon application of an appropriate signal to the electromagnet 44.

Each of the indicating flags is provided with a retaining guide plate 46, and each such plate includes a pair of tab portions which extend into the slots of arms 34 so as to fix the plate to the frame 32 while the indicator flags are moveable up and down in the channels formed by these guide plates.

Each guide plate and its associated indicator flag is coupled by a flat spring 49 which is held flat against the indicator flag by the guide plate. One extremity of this spring is fixed to the indicator flag and the other extremity is fixed to one of the tabs of the guide plate as shown. This spring is placed in compression when the indicator flag is in its lowermost position but, when released, it expands to drive the flag in an upward direction and finally restrains the upward movement of the flag in its uppermost position. Alternatively, however, shoulders 35 of the indicator flags may be appropriately positioned to abut against the arms of transport 36 so as to arrest the upward movement of the indicator flags in an upper extreme position even before spring 49 is fully extended. This upper extreme position, in view of the coaxial mounting of the indicator flags, corresponds, in a vertical sense, to that of the illustrated digit zero. Hence, that indicator flag of highest numerical significance of all the indicator flags in the upper extreme position serves to mask any flags of lesser significance from the viewer to the right.

Fixed to the lower portion of each indicator flag are electromagnetically responsive elements 48. In this embodiment, the elements shown are constructed of ferromagnetic material. These elements are respectively arranged on the indicator flags in distinctive space coded relationship corresponding to the digital significance of the associated flag.

Fixed to the frame member are four electromagnets 52, 54, 56, 58. These electromagnets are arranged in a space coded relation corresponding to that of the elements 48 and are disposed for cooperation with these elements when the flags are in the extreme lower position as will be discussed hereafter. With particular advantage these elements are loosely fixed to the flags as indicated by the over large apertures associated with these flags and indicator members as shown.

Spaced between the electromagnetic cores are magnetic shields which take the form of bars 62, 64, 66. The function of these bars later appears.

Figures 2, 3:
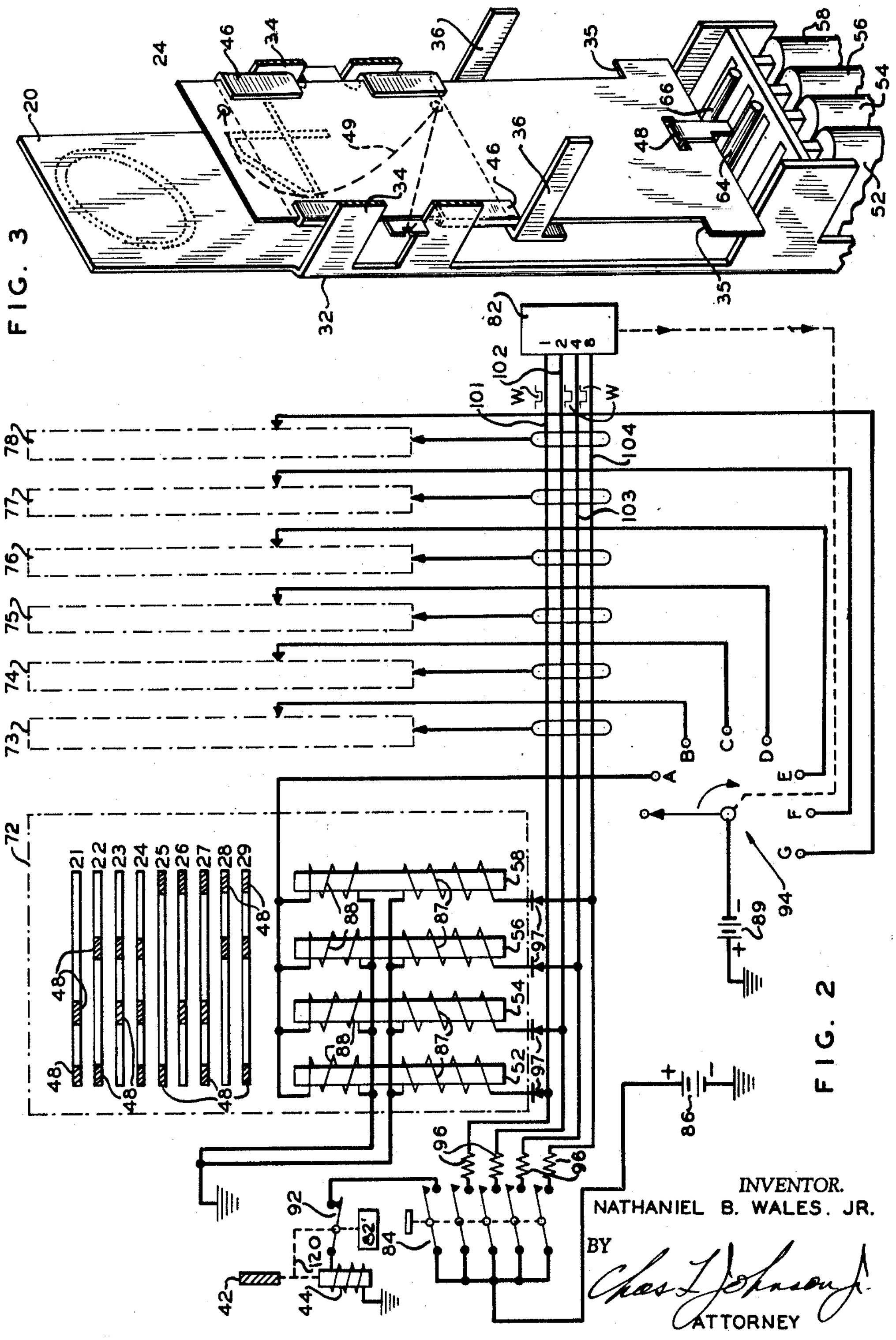
FIG. 2 is a functional schematic diagram illustrating in some detail arrangements in accordance with the invention for advantageously employing the display apparatus illustrated in FIG. 1.
FIG. 3 is an isometric drawing of an individual display apparatus shown in FIG. 1 but with some structural elements eliminated for purposes of clarity in focusing attention on other particular structural elements.

Turning now to FIG. 2, there is shown an arrangement of plural indicator flags 21 through 29 in a single indicator unit 72 in accordance with FIG. 1 for cooperation with data processing apparatus represented symbolically by the box 82. In like manner there are shown other indicator units 73 to 78 arranged in side by side relation with indicator unit 72 for displaying an entire multi-digit number. As shown in plan view, the nine indicator flags 21 through 29 of indicator unit 72, each having a distinctive space coded arrangement of elements 48, are arranged for cooperation with electromagnets 52, 54, 56, 58.

A five pole switch 84 is provided for applying a current from a source 86 through isolating resistors 96 and diodes 97 to first windings 87 associated with each of the electromagnets 52, 54, 56, 58; and also to the electromagnet 44 through switch 92. The diodes 97 serve to prevent sneak circuits by isolating portions of the circuit from other circuit paths.

A review of the function of these electromagnets may now be in order. Upon closure of the multiple switch 84, a heavy biasing current is applied to the windings associated with each of the electromagnets in the indicator unit 72 and the associated indicator units 73 through 78. At the same time an energizing potential is applied through switch 92 to the electromagnet 44 and, as a result, the arm 42 is drawn downwardly against spring tension of spring 49 for driving the electromagnetically responsive elements 48 into contacting relation with cores of the electromagnets 52, 54, 56, 58. This serves to reset all of the moveable indicator flags into their lowermost non-indicating position. Upon reaching this position, a suitable linkage, indicated by dashed line 120, actuates snap switch 92 thereby to deenergize the electromagnet 44. Now the arm 42 resumes a normal position and all indicator flags are held magnetically in contact with the cores of electromagnets 52, 54, 56, 58. At this time the fixed digit zero flag is displayed by each indicator unit or flag group 72 through 78. Thus, this system in accordance with the invention is initially reset so as to be conditioned for display of data processing information.

Figure 4:
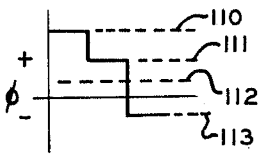
FIG. 4 is a diagram of the magnetic flux acting on the indicating members of the invention as shown in FIG. 2.

The force holding each flag may be shown in FIG. 4 as a magnetic flux level 110.

It will be clear to those skilled in the art that the heavy restraining magnetic bias may be accomplished by permanent magnets in an appropriately magnetized condition without departing from the spirit and scope of the invention. Such magnets would provide the force generated by current from source 86 through coils 87 of FIG. 2 or the current from source 118 through coil 114 of FIG. 5.

It is in this condition that the loose fixation of the ferromagnetic elements in the indicator flags becomes of particular advantage. The electromagnetic force between the space coded elements 48 and the electromagnets varies with distance according to the well-known inverse square law. At the same time, the indicator flags move between two extreme positions, indicating and non-indicating. The loose fixing of the space code elements enables them to be brought into most effective intimate contact with the electromagnets but does not impose a similar requirement for delicate positioning of the binarily positioned, indicating flags.

Associated with each of the electromagnets 52, 54, 56, 58 is a second winding 88. These second windings are wound and connected in serial circuit with a selector switch 94 for applying magnetizing current from source 89 to the electromagnets to create a magnetizing force therein in opposition to that provided by the current through the switch 84. If desired an asymmetrically conducting device such as a diode may be placed in series with each of windings 88, as it the case with windings 87, to prevent any undesired sneak circuits. Upon rotation of selector switch 94 to position A, associated with indicator unit 72, a potential is applied to the windings 88 to establish a magnetizing force in opposition with the magnetizing force generated by the windings 87 and thus, to reduce the cores of the electromagnets 52, 54, 56, 58 from a heavily magnetized condition to a threshold condition. Referring again to FIG. 4 this reduced force on each indicating flag may be represented by the magnetic flux level designated 111. In FIG. 4 the flux level at which the spring will cause the flag to break away from the holding magnets is designated as 112.

In this threshold condition, the indicator flags are held in contact with the cores of the electromagnets 52, 54, 56, 58. This holding, however, is a bare holding.

Returning to the structure of FIG. 1, associated with each of the indicator members 21 through 24 is a flat spring 49. This spring is held flat against the indicator flag by the retaining member 46. One extremity of this spring is fixed at one end of the indicator flag and the other extremity is fixed to the retaining member as shown. This spring is placed in compression as the indicator flag is drawn down by the arm 42 while the retaining member is held in vertical position by arms 34.

Recalling the springs 49 of FIG. 1, associated respectively with the individual indicator flag members, these springs are designed such that, in conjunction with the electromagnetically responsive members 48 which are also associated with that same indicator, the spring force urging the respective indicator members upwardly is just barely overcome by the holding force of the magnets 52, 54, 56, 58.

In this condition, as signals are applied to the respective conductors 101, 102, 103, 104 by the signal generating apparatus 82 which may be any well-known data processing apparatus having digital output signals, negative going pulses indicated by the wave forms W are propagated selectively along the conductors to which the holding bias potential is applied from the battery 86 through switch 84 and its associated resistance. Thus, through operation of the signals applied to these conductors in the illustrated case, the holding magnetization of electromagnets 52, 56, 58 is overcome. That is, spring members associated with indicator flags 21, 22, 23, 28, 29 overcome the signal reduced magnetic threshold field. This is shown graphically in FIG. 4 where flux level 113 represents the magnetic flux existing when a signal from computer 82 exists. It is seen the flux level is below the holding level 112 and therefore the indicator is released. Accordingly, the springs 49, respectively associated with the indicator flags, drive these flags into an upper indicating position with the flag member 29 bearing the numerical designator "9" being foremost in the array of the so positioned indicator members. Thus, a positive indication of the digit "9" is given by the indicator group 72.

Thereafter, the selector switch 94 being rotated to position B, the associated core members in the group 73 are all placed in a threshold condition for subsequent actuation by signals propagated along conductors 101, 102, 103, 104 from the signal source 82.

These signals are of a sufficient level to overcome the holding bias on the cores of the indicator unit 72 and, hence, each of the magnets of unit 72 which receives one of these signals, such as the magnets 52, 56, and 58 of FIG. 2, will release its associated armature element 48. This serves to release one or more of the indicator flags of unit 72. However, these signals are of insufficient level to overcome the more substantial magnetic bias on the magnets of indicator units 73 to 78 and hence the indicator flags of this unit are unaffected by the input signals.

Advantageously, the hysteresis loop characteristics of the different magnetic cores 52, 54, 56, 58 are uniform so that each of these cores can be biased by winding 88 to a point just short of the threshold magnetization level. This permits the use of very low level pulses on conductors 101 to 104 to release armatures 48.

It will be seen from the indicator members 21 to 29 of FIG. 2 that different ones of these members contain differently arranged electromagnetically responsive elements 48. These elements are arranged in accordance with the following code:

| Indicator member: | Element 48 arrangement |
|---|---|
| 21 (No. 1) | 0011 |
| 22 (No. 2) | 0101 |
| 23 (No. 3) | 0110 |
| 24 (No. 4) | 0111 |
| 25 (No. 5) | 1001 |
| 26 (No. 6) | 1010 |
| 27 (No. 7) | 1011 |
| 28 (No. 8) | 1100 |
| 29 (No. 9) | 1101 |

It will be noted from the above tabulation of the positioning of elements 48 on the respective indicator members that signals appearing on selected ones of conductors 101 to 104 will release selected ones of the indicator members 21 to 29. While various codes may be chosen to achieve this selection the described code is advantageous in that, with this code, six of the indicator members can be chosen without also selecting lower ordered members (i.e., the selection of any of the members 21, 22, 23, 25, 26, and 28 will not result in the simultaneous selection of any other members) and, in addition, the maximum number of members ever selected at one time is four. This is in the selection of members 24 and 29. The result of this is that the power required to reset the indicator members is minimized.

Also, with the chosen code, there are always two or three magnets being energized by the selection pulses, never one or four. As a result, the level of selection signals need only be sufficient that two of such signals, taken in combination, will supply sufficient magnetizing force. This, advantageously, results in reduced power requirements for the selection signals.

Thus, the selecting switch 94, which may well be any of the many well-known high speed switches, successively conditions the indicator arrays 72, 73, 74, 75, 76, 77, 78 for actuation in response to the short duration, low level digital signals derived from the computer pulse signal generator 82.

In FIG. 2 it may be seen that the switch 92 may be reset upon proper activation from a portion of computer 82 designated 82'. This in turn allows relay 44 to reset all the flags upon operation of switch 84.

In FIG. 3 there is shown in simplified structural detail some essential elements of the display apparatus of FIG. 1. Here an important structural feature of the invention is illustrated. A single isolating shield, rod 66, is shown in connection with display flag having a single electromagnetic element 48. This rod 66 is constructed of high permeability shielding material, in this case a ferromagnetic material such that stray magnetic flux from the electromagnet 58 is passed through the rod to the frame member. Thus, the rod 66 serves to protect the illustrated electromagnetically responsive element 48 from the effect of any magnetic fields other than that intended to be associated with this particular element. Quite obviously, the rod members 62, 64, shown only in FIG. 1, complement the function of single rod 66 shown in FIG. 3.

A slight variation in the above operation is shown schematically and graphically in FIGS. 5 and 6 where a holding magnet 114, of FIG. 5, which could be either a permanent magnet or an electromagnet, acts directly or against spring tension to position an indicator element. The flux or force level of such operation is indicated by 110 of FIG. 6. As shown in FIG. 5 an enabling electrical ground control may be activated by switch 94 so that upon the proper signal from computer 82 the coil 116 acts to drop the magnetic flux level, indicated in FIG. 5, to condition 113 which is less than the holding force or flux level 112. It is seen that this one step system is in some ways simpler than the two step system described in reference to FIG. 2.

Although there has been described specific structure embodying principles of the invention, other varied embodiments of the invention will readily occur to those skilled in the art without departing from the spirit of the invention. Thus, for example, electromagnetic signal generators may be electrostatic rather than magnetic in operation.

What is claimed is:

1. In combination with data processing apparatus, an array of plural groups of variably positioned indicating members, said members respectively having electromagnetically responsive elements fixed thereto in space coded relation, means for steadily urging the members of said plural groups toward a first indicating position, a like plurality of groups of electromagnetic bias signal sources for cooperation with said elements to urge the members of said plural groups to an opposite, non-indicating position, means for bringing said elements respectively into immediate proximity with said sources for overcoming said steadily urging means, means for applying a control signal selectively to groups of said signal sources to oppose said bias signal thereby to place said sources in a threshold condition for overcoming said steadily urging means, and means for applying information signals to selected sources of said groups in cooperative relation with said control signal and said urging means, thereby to overcome bias signal action of said sources on selected ones of said elements.

2. In combination with data processing apparatus, an array of plural groups of variably positioned indicating members, said members having electromagnetically responsive elements fixed thereto in space coded relation, means for steadily urging the members of said plural groups toward a first extreme indicating position, a like plurality of groups of electromagnetic signal generators for cooperation with said elements to urge the members of said plural groups to an opposite extreme position in response to bias signals applied thereto, means for applying a bias signal to the generator groups of said like plurality, thereby to negate said steadily urging means, means for applying a bias opposing signal to the generators of selected groups of said like plurality, thereby to place said last named generators in a threshold condition for overcoming said steadily urging means, and means for applying further bias opposing signals to selected signal generators among the generators of said plurality of groups, whereby said steadily urging means drive selected indicating members, associated with said last named selected generators, toward said indicating position.

3. Apparatus as set forth in claim 2 wherein said steadily urging means comprise plural individual means associated respectively with individual ones of said indicating members.

4. Apparatus as set forth in claim 2 wherein said electromagnetically responsive elements are constructed of ferromagnetic material and wherein said electromagnetic signal generators comprise magnetic cores having plural windings thereabout.

5. Apparatus as set forth in claim 2 wherein said groups of indicating members comprise members arranged sequentially along a common axis for providing mutual shielding in order from a member indicating a highest digit to a member indicating a lowest digit.

6. Apparatus as set forth in claim 2 and in combination therewith, plural groups of shielding members associated with each of the generator groups of said like plurality, the members of said last named groups being respectively disposed between adjacent signal generators.

7. In combination with a data processing system, apparatus for displaying significant quantities which comprises, a first plurality of information digit indicator members sequentially arranged along a first axis, support means for constraining motion of the so arranged indicator members of said plurality in a direction transverse to said axis, each indicator member of said first plurality having at least one electromagnetically responsive element disposed in distinctive space coded arrangement thereon, a plurality of electromagnetic field generators respectively disposed in cooperative relation with said responsive elements and in space coded arrangement corresponding to the arrangement of said responsive elements, means for applying a bias potential to said field generators of a magnitude to hold all indicator members of said first plurality in a first extreme position with respect to said generators, means for selectively applying an opposing bias potential to said generators, thereby selectively to establish an intermediate, threshold field holding relation between said indicator members and said generators, spring urging means associated with each indicator member of said first plurality for opposing the force of said threshold field at a level less than that of said threshold field, and means for selectively applying signals to individual generators of said second plurality in a direction to oppose said threshold field, whereby selected indicators of said plurality are urged by said spring means to an opposite, second extreme position with respect to said generators.

8. In combination with a data processing system, apparatus for displaying significant quantities which comprises, a first plurality of groups of information digit indicator members, said groups being arranged for simultaneous observation, the indicator members of each group further being sequentially arranged along an axis for exclusive observation of a single indicator member, support means associated with each group of said first plurality for constraining indicator members of the group for motion in a direction transverse to said axis, electromagnetically responsive elements arranged in distinguishing space coded patterns on individual indicator members, respectively, a second, like plurality of groups of electromagnetic field generators, the individual generators of each group being respectively associated with individual responsive elements associated with indicator members of each group, means for establishing a holding bias potential on all field generators of said second plurality, thereby to urge all indicator members of said first plurality to a first extreme position, means for selectively applying an opposing bias potential to groups of said generators, thereby selectively to establish an intermediate, threshold field, holding relation between indicator members of selected groups and associated generators, urging means associated with all individual ones of said indicator members for opposing said threshold field at a level less than said threshold field, and means for applying signals in common to selected generators in each group of said second plurality of groups in a direction to oppose said biasing field beyond said threshold relation, whereby the selected indicators in groups associated with threshold biasing fields are moved by said urging means to an opposite extreme position with respect to said generators.

9. In combination with a data processing system, display apparatus which comprises a plurality of information bearing indicator members, guide means for constraining said indicator members to move between a first extreme indicating position and an opposite extreme, non-indicating position, actuating means for urging said indicating members toward the first extreme indicating position, a plurality of electromagnetically responsive members, members of said last named plurality being fixed in distinctive space coded relation on the indicating members of said first named plurality respectively, a plurality of electromagnetic signal generators arranged in cooperative relation with said electromagnetically responsive elements and oriented for selectively urging said indicator members in opposition to said actuating means in response to electromagnetic signals applied thereto, signal control means for applying a biasing signal to said electromagnetic signal generator, means for bringing the indicator members of said first named plurality into proximate relation with said electromagnetic signal generators, means for selectively applying a threshold biasing signal to said generators, thereby to establish an equilibrium holding relation for selected indicator members of said plurality between said actuating means and said signal generators, and means for applying signals derived from said data processing apparatus selectively to individual ones of said generators in a direction to oppose said biasing signal, whereby the indicating members of said plurality are selectively transported to said extreme indicating position under the urging of said actuating means.

References Cited in the file of this patent

UNITED STATES PATENTS

| | | |
|---|---|---|
| 1,872,126 | Daine et al. | Aug. 16, 1932 |
| 2,170,694 | Perry | Aug. 22, 1939 |
| 2,859,431 | Morris | Nov. 4, 1958 |
| 2,896,845 | Hansen et al. | July 28, 1959 |
| 2,908,278 | Goerlich | Oct. 13, 1959 |